United States Patent [19]

Prunier

[11] 4,176,909

[45] Dec. 4, 1979

[54] PROCESSES FOR PREPARING A CONNECTOR END ON A FIBER BUNDLE OPTICAL CABLE AND CABLES THUS OBTAINED

[75] Inventor: Jean-Claude Prunier, Herblay, France

[73] Assignee: Souriau et Cie, Billancourt, France

[21] Appl. No.: 869,497

[22] Filed: Jan. 16, 1978

[30] Foreign Application Priority Data

Jan. 18, 1977 [FR] France .................................. 77 01315

[51] Int. Cl.$^2$ ............................................. G02B 5/14
[52] U.S. Cl. ................................. 350/96.20; 156/73.2; 156/73.5
[58] Field of Search ............... 350/96.20, 96.21, 96.22; 156/73.1, 73.2, 73.5, 73.6

[56] References Cited

U.S. PATENT DOCUMENTS

| | | | |
|---|---|---|---|
| 2,992,956 | 7/1961 | Bazinet, Jr. ........................ | 350/96.24 |
| 3,455,625 | 7/1969 | Brumley et al. ................... | 350/96.22 |
| 3,846,010 | 11/1974 | Love et al. ......................... | 350/96.22 |
| 4,116,655 | 9/1978 | Lewis ................................. | 350/96.22 |

*Primary Examiner*—Stewart J. Levy
*Attorney, Agent, or Firm*—Larson, Taylor and Hinds

[57] ABSTRACT

A connector tip is fixed to one end of an optical cable of a bundle of fibers surrounded by an outer protector sheath constituted by a thermoplastic material, the tip being also constituted by a thermoplastic material heat-weldable with that of the outer sheath. The sheath is removed in the vicinity of said end, the tip is placed in position on this end so that it surrounds and is in contact with, a zone of the cable stripped of its outer sheath and with a zone of the cable provided with its outer sheath and adjacent to said stripped zone. The tip is subjected to a radial flow of ultrasound at the same time as exerting on it a radial compressive force which in the region of the tip surrounding the outer sheath, welds the surfaces in contact with the tip and with the outer sheath together and the outer sheath is gripped around the bundle of fibers and, in the region of the tip surrounding the stripped zone, the softened thermoplastic material of the tip is forced between the fibers situated at the periphery of the bundle and in the immediate vicinity of the tip, and the fibers are gripped together.

18 Claims, 9 Drawing Figures

PROCESSES FOR PREPARING A CONNECTOR END ON A FIBER BUNDLE OPTICAL CABLE AND CABLES THUS OBTAINED

BACKGROUND OF THE INVENTION

1. Field of the Invention

The invention belongs to the technical domain of fiber bundle optical cables, that is to say light wave guides constituted by the juxtaposition of several optical fibers generally, but not exclusively, of glass) forming a bundle which is itself surrounded by an outer protector sheath formed of a thermoplastic material, and it relates to processes for preparing, for their connection, ends of optical cables of the aforesaid type, by equipping them with connector tips and/or by cutting these ends and by polishing the front surface thereof.

2. Description of the Prior Art

Fiber bundle optical cables are already known which are provided with a metallic connector tip. The end of the cable is stripped of its outer sheath and the tip fixed on the cable surrounds, on the one hand, the zone of the cable stripped of its outer sheath, and, on the other hand, a zone of the cable provided with its outer sheath and adjacent to the abovesaid zone of the cable stripped of its outer sheath.

The fixing of such a metallic tip on the end of the cable necessitates, after removal of an end portion of the outer protector sheath, the amalgamation of the denuded ends of the optical fibres by means of a suitable polymerisable resin, the glueing of the outer sheath to its portion intended to penetrate into the tip and, after positioning of the tip, the polymerisation of the resin.

Now the special resins used for this purpose have a rather long polymerisation time, which can amount to several hours, which unfavourably influences the rates of production of optical cables equipped with tips.

In addition, once the polymerisation of the resin has been effected, it is necessary to proceed with rectification of the end of the optical cable, by sawing if the length of the fibers extending beyond the tip is too great, followed by polishing the front surface of the cable by means of abrasives with very fine granulometry in order that the front surface of the bundle may be flat and perfectly polished.

Here again long and delicate operations are involved, which can only be carried out after complete polymerisation of the resin (effected too soon, these operations would risk displacing the fibers with respect to one another).

It has also been attempted to crimp the tip on the end of an optical cable: the essential drawback of this process is that of exerting stress on the fibers, which sometimes can even break.

It is an object of the invention to overcome the drawbacks of known processes.

Other objects and advantages of the invention will emerge from the description which follows.

GENERAL DESCRIPTION OF THE INVENTION

In the following description, there is meant by "front part of the tip" the portion of the tip most neighbouring the free end of the optical cable on which it is mounted and, by "rear part of the tip" the portion of the tip most remote from said end of the cable.

According to a first feature of the invention relating to bare fiber bundle optical cables, that is to say fibers not covered with individual protector sheaths, the outer sheath and the tip being constituted of thermoplastic material weldable together under the effect of heat, the following operations are proceeded with:

the outer sheath of the cable in the vicinity of the end of the latter is removed, the tip is placed in position on this end so that it surrounds and is in contact with on the one hand a zone of the cable stripped of its outer sheath and, on the other hand, a zone of the cable surrounded by its outer sheath and adjacent to said zone stripped of its outer sheath, and the tip is subjected to a radial flow of ultra-sound at the same time as exerting on it radial compressive force, due to which, on the one hand, in the region of the tip surrounding the outer sheath, the surfaces in contact of the tip and of the outer sheath are welded to one another and the outer sheath is gripped around the fiber bundle, and, on the other hand, in the region of the tip surrounding the zone of the cable stripped of its outersheath, the softened thermoplastic material of the tip is caused to penetrate between those fibers situated at the periphery of the bundle of fibers and in the immediate vicinity of the tip and the fibers of the bundle are gripped together.

According to a second feature of the invention relating to optical cables in which each fiber is surrounded by an individual protector sheath, the outer sheath of the cable, the individual sheaths of the fibers and the tip being constituted of thermoplastic materials weldable together under the effect of heat, the following operations are proceeded with:

the outer sheath of the cable in the vicinity of the end of the latter is removed whilst leaving the individual sheaths around the corresponding fibers, the tip is positioned on this end so that it surrounds and is in contact with, on the one hand, a zone of cable stripped of its outer sheath, and on the other hand, a zone of the cable surrounded by its outer sheath and adjacent to said zone of stripped of its outer sheath and the tip is subjected to a radial flow of ultra-sound at the same time as exerting upon it a radial compressive force, by which, on the one hand, in the region of the tips surrounding the outer sheath, the surfaces in contact of the tip and of the outer sheath are welded to one another and the outer sheath is gripped around the fiber bundle and, on the other hand, in the region of the tip surrounding the zone of the cable stripped of its outer sheath, the tip and the individual sheaths of those of the fibers which are situated at the periphery of the fiber bundle and in the immediate proximity of the tip are welded along their lines of contact, at least the individual sheaths of those of the fibers which are situated at the periphery of the fiber bundle are welded along their lines of contact and the fibers of the bundle are gripped together.

The invention may also be practised without it being necessary to remove the outer sheath from the optical cable in the vicinity of the end of the latter on which it is desired to fix the tip.

For this purpose, according to a third feature of the invention relating to optical cables with bundles of bare fibers, the outer sheath and the tip being constituted of thermoplastic materials weldable together under the effect of heat, the following operations are proceeded with:

the tip is placed on the end of the optical cable so that it surrounds and is in contact over the whole of its length with a zone of the cable provided with its outer sheath, and the tip is subjected to a radial flow of ultra-sound at the same time as exerting on it a radial compressive force, due to which, on the one hand, the surfaces in contact of the tip and of the outer sheath are welded to one another and the outer sheath is gripped around the fiber bundle and, on the other hand, in the front part of the tip, the softened thermoplastic material of the outer sheath is made to penetrate between those of the fibers which are situated at the periphery of the fiber bundle and in the immediate vicinity of the outer sheath and the fibers are gripped together.

According to a fourth feature of the invention relating to optical cables in which each fiber is surrounded by an individual protector sheath, the outer sheath of the cable, the individual sheaths of the fibers and the tip being constituted of thermoplastic materials weldable together under the effect of heat, the following operations are proceeded with:

The tip is placed in position on the end of the optical cable so that it surrounds and is in contact over the whole of its length with a zone of the cable provided with its outer sheath, and the tip is subjected to a radial flow of ultra-sound at the same time as exerting on it a radial compressive force, due to which, on the one hand, the surfaces in contact of the tip and of the outer sheath are welded to one another, and, the outer sheath is gripped around the bundle of fibers, and on the other hand, in the front part of the tip, the outer sheath and the individual sheaths of those of the fibers which are situated at the periphery of the fiber bundle and in the immediate proximity of the tip are welded along their lines of contact, at least the individual sheaths of those of the fibers which are situated at the periphery of the fiber bundle are welded together along their lines of contact and the fibers are gripped together.

By means of this process, the welding of the outer sheaths of the cable and of the tip, on the one hand, and the uniting of the tip and/or the outer sheath with the peripheral fibers of the bundle, on the other hand, are effected simultaneously and very rapidly under the effect of ultra-sound, which causes, by a heating effect due to the friction of the surfaces against one another, softening of the thermoplastic materials resulting in the welding of the surfaces in contact of the tip and of the outer sheath of the cable and the uniting of the tip and/or of the outer sheath with the optical fibers. In addition, the radial compressive force exerted during softening of the thermoplastic materials has the effect, on the one hand, of bringing the fibers close to one another to the maximum in the front part of the tip, which notably improves the efficiency of optical transmission of such a connection, and on the other hand, of gripping the outer sheath around the fiber bundle, thus preventing the fibers from moving with respect to one another.

To facilitate the positioning of the tip on the optical cable, it is advantageous to construct the tip in the form of two half-shells, joined to one another to surround the end of the cable and welded to one another under the effect of ultra-sound and at the same time that they are welded respectively to the outer sheath of the cable and if necessary also to the individual sheaths of the fibers situated at the periphery of the bundle.

It is preferable for the front part and the rear part of the tip to be subjected to radial compressive forces of different intensities, the force exerted on the front part of the tip being greater than the force exerted on the rear part of the tip. The zone of the optical cable surrounded by the tip thus undergoes a progressive stress from the rear to the front of the tip, which enables the production of the bringing together of the fibers in the vicinity of the end of the optical cable, which, bringing together procures a better light transmission, as indicated previously, whilst avoiding excessive stress capable of causing breakage of certain fibers at the level of the rear part of the tip, which excessive stress could occur if the tip were subjected, over the whole of its length, to forces of the same intensity as that exerted on its front part.

According to another feature of the invention which can be advantageously used, without however this being obligatory, in combination with one of the above-indicated features, to cut a fiber bundle optical cable and to polish the front surface of that cable, the cutting and polishing are effected in the course of a single and same operation by means of a knife subject to the action of ultra-sound, an abrasive being interposed between the front surface of the optical cable and the facing surface of the knife.

To facilitate the cutting of the optical cable, it is desirable that the cutting edge of the knife be diamonded; preferably, in addition, the supporting force of the knife on the cable is due to suitable means, advantageously constituted by the weight of the tool and of the apparatus that carries it.

To obtain rapid polishing, the surface of the knife turned towards the front surface of the optical cable to be polished may be provided with an abrasive coating of relatively fine granulometry, the cutting edge of the knife being, itself, provided with an abrasive coating with relatively coarse granulometry.

It is also possible to use a knife with a smooth surface, a liquid containing an abrasive of suitable granulometry being projected between the surface of the knife and the surface to be polished.

According to another aspect of the invention, in an optical cable with a bundle of fibres surrounded by an outer protector sheath constituted of a thermoplastic material and provided at one of its ends with a connector tip, the cable being stripped of its outer sheath in the vicinity of said end and the tip surrounding, on the one hand, a zone of the cable stripped of its outer sheath and, on the other hand, a zone of the cable provided with its outer sheath and adjacent to said zone stripped of its outer sheath, the tip is also constituted of thermoplastic material weldable under the action of heat with that of the outer sheath and, on the one hand, in the region of the tip surrounding the outer sheath the surfaces in contact of the tip and of the outer sheath are welded to one another, the outer sheath being gripped around the fiber bundle, and, on the other hand, in the region of the tip surrounding the zone of the cable stripped of its outer sheath, the constituent material of said tip occupies at least partially the interstices comprised between those of the fibres which are situated at the periphery of the bundle of fibers and which are in contact with the tip, the fibers being gripped together.

In addition, and still according to the invention, in an optical cable with a bundle of fibers surrounded by an outer protector sheath and provided at one of its ends with a connector tip, each fiber of the bundle being itself surrounded by an individual protector sheath, the outer sheath and the individual sheaths being of thermoplastic material, the cable being stripped of its outer sheath in the vicinity of said end and the tip surrounding, on the one hand, the zone of the cable stripped of its outer sheath and, on the other hand, a zone of the cable stripped of its outer sheath and adjacent to said zone stripped of its outer sheath, the tip is also constituted of a thermoplastic material weldable under the action of heat, with those of the outer sheath and of the individual sheaths and, on the one hand, in the region of the tips surrounding the outer sheath, the tip and the outer sheath are welded to one another over their whole contact surface, the sheath being gripped around the bundle of fibers and on the other hand, in the region of the tip surrounding the zone of the cable stripped of its outer sheath, the tip and the individual sheaths of those of the fibers which are situated at the periphery of the bundle of fibers are welded along their lines of contact and at least the individual sheaths of said fibers situated at the periphery of the bundle of fibers are welded together along their lines of contact, the fibers being gripped together.

According to yet another aspect of the invention, in an optical cable with a bundle of fibers surrounded by an outer protector sheath constituted of a thermoplastic material provided at one of its ends with a connector tip surrounding over the whole of its length a zone of the optical cable provided with its outer sheath, the tip is also constituted of a thermo-plastic material weldable under the action of heat with that of the outer sheath, and, on the one hand, the surfaces of contact of the tip and of the outer sheath are welded to one another, the outer sheath being gripped around the fiber bundle and on the other hand, in the front part of the tip, constituent material of the outer sheath occipies at least partially the interstices comprised between those of the fibers which are situated at the periphery of the bundle of fibers and which are in contact with the outer sheath, the fibers being gripped together.

Finally, still according to the invention, in an optical cable with a bundle of fibers surrounded by an outer protector sheath and provided at one of its ends with a connector tip, surrounding over the whole of its length a zone of the optical cable provided with its outer sheath, each fiber being itself surrounded by an individual sheath, the outer sheaths and the individual sheaths being of thermoplastic materials weldable together under the action of heat, the tip is also constituted of a thermoplastic material weldable under the action of heat with that of the outer sheath and, on the one hand, the tip and the outer sheath are welded to one another over the whole of their contact surface, the outer sheath being gripped around the bundle of fibers, and on the other hand, in the front portion of the tip, the outer sheath and the individual sheaths of those of the fibers which are situated at the periphery of the bundle of fibers are welded along their lines of contact and at least the individual sheaths of said fibers situated at the periphery of the bundle of fibers are welded together along their lines of contact, the fibers being gripped together.

It is advantageous, in the case of optical cables with fibers coated with an individual sheath, that all the individual sheaths be welded together along their lines of contact.

BRIEF DESCRIPTION OF THE DRAWINGS

The invention will be better understood on reading the description which follows in which reference is made to the accompanying drawings, made on a very much enlarged scale, in which:

In FIG. 1, the reference numeral 1 denotes generally a fiber bundle optical cable composed of a bundle of optical fibers 2 of glass, juxtaposed, and of an outer protector sheath 3, of a thermoplastic material surrounding said bundle, and the end of this cable being visible in the Figure.

Figure 4:
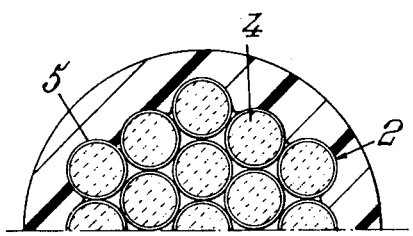
FIG. 4 is a transverse half-section, on an even greater scale, along the line IV—IV of FIG. 1, of a portion of an optical cable equipped with a tip, according to the invention.

By way of indication, as is shown for example in FIG. 4 drawn on a larger scale, each fiber 2 is constituted by a central core 4 of glass, in which the light is propagated, surrounded by an outer envelope 5, also of glass, having a refractive index lower than that of the central core 4.

If necessary each fiber may be surrounded by a sheath of thermoplastic material as will be explained later with reference to FIGS. 5 and 6.

Of course, the structure of the fibers is only given by way of example, and all the various features of the invention may just as well be applied to cables including optical fibers of another structure and also to cables including fibers formed of other materials than glass (for example of plastics material on condition that the temperature of fusion of this plastics material is higher than those of the constituent materials of the sheath and of the tip).

DESCRIPTION OF PREFERRED EMBODIMENTS

Referring to FIGS. 1 to 4, there will initially be described a first feature of the invention enabling the fixing of a connector tip 6 on the end of a cable 1 equipped with bare optical fibers, that is to say not coated with individual protector sheaths.

According to the invention, tip 6 is formed of a thermoplastic material capable of being welded, under the effect of heat,, with the constituent thermoplastic material of the outer sheath 3.

Figure 1:
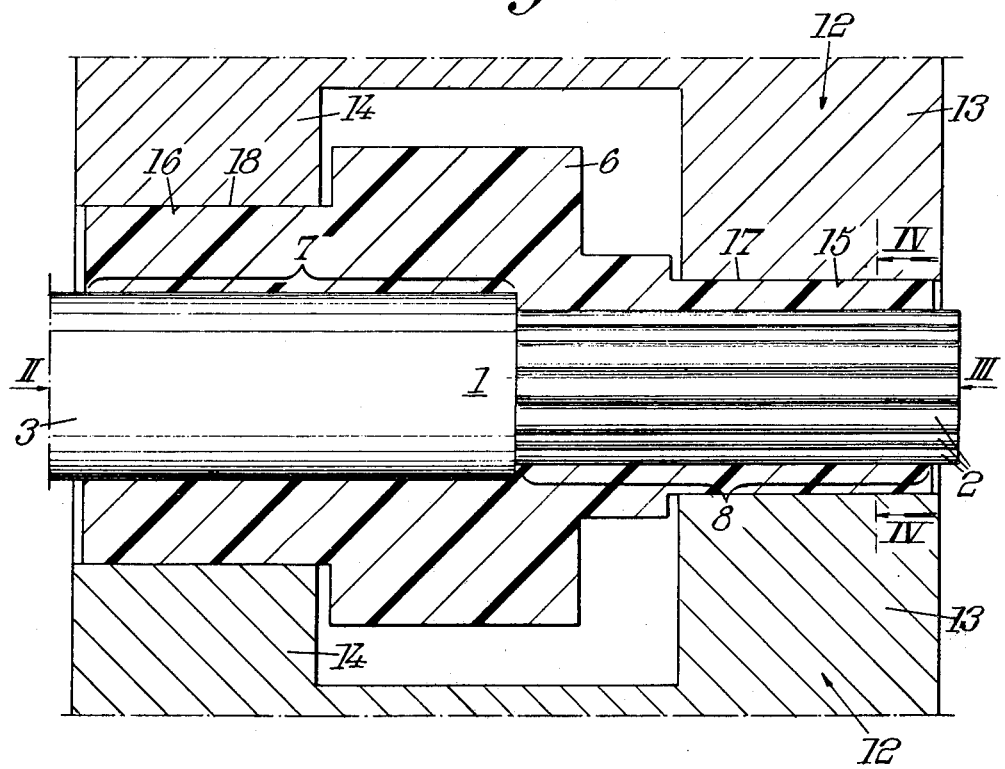
FIG. 1 illustrates in lateral section along the axis of a fiber bundle optical cable the placing in position of a tip on said cable, according to the invention.

In FIG. 1, the tip 6 is shown in the form of an essentially tubular element provided, externally, with annular projections of different diameters defining shoulders; these projections and shoulders are intended, on the subsequent connection of the optical cable, for the correct positioning, both axially and transversally, of the cable facing other optical components. In any case, this is only a non limiting example, and a tip of any external shape would be equally suitable.

The cable 1 is firstly stripped of a portion of its sheath 3 in proximity to its end and the tip 6 is threaded onto this end so that it surrounds and is in contact with, on the one hand, a zone 8 of the bundle stripped of the sheath 3 and, on the other hand, a zone 7 of the bundle provided with its sheath and adjacent to the abovesaid zone 8 stripped of its sheath. For purposes of explanation, it may be considered that the zone 8 constitutes the front portion of the tip and that the zone 7 constitutes the rear portion of the tip.

Figure 2:
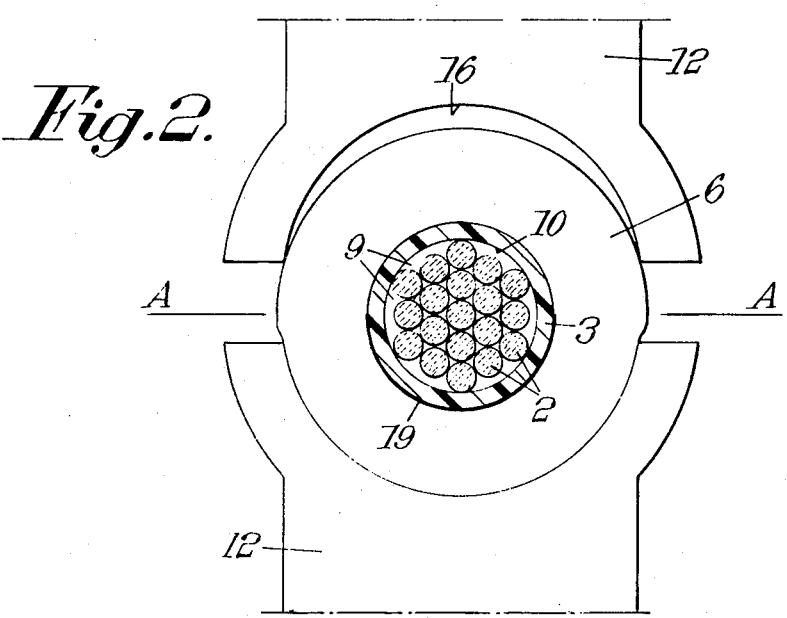
FIG. 2 shows two half-views at an end along the arrow II of FIG. 1, the upper half view showing the cable before fixing of the tip and the lower half view showing the cable after fixing of the tip.
Figure 3:
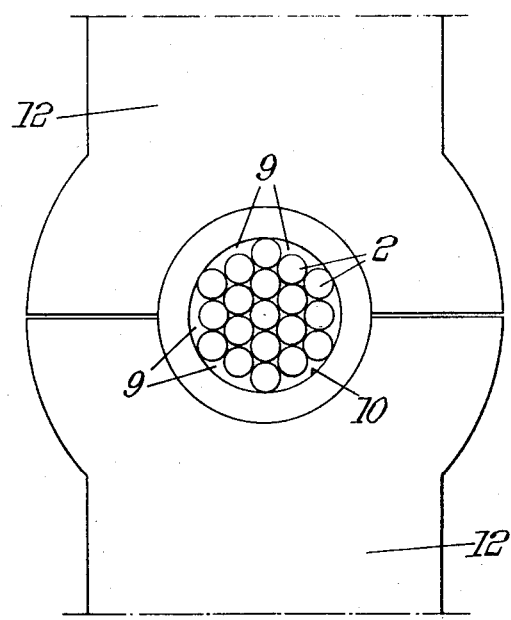
FIG. 3 is an end-view along the arrow III of FIG. 1.

As can be seen in FIGS. 2 and 3, gaps 9 exist between the inner surface 10 of the tip and those of the fibers which are situated at the periphery of the bundle of fibers.

There is then brought in contact with the outer surface of the tip two jaws 12 (called sonotrodes) connected to an ultrasound generator (not shown).

Each of the sonotrodes 12 is composed of two contact parts 13 and 14 having respectively contact surfaces 15 and 16 in the shape of a semicylinder of revolution whose radius is slightly less than that of the cable (as shown in FIG. 2) for a purpose which will be explained below. These contact surfaces are situated respectively at the front of the tip at the level of the abovesaid zone 8 of the cable stripped of its outer sheath 3 and at the rear of the tip at the level of the abovesaid zone 7 of the cable provided with its sheath.

The united contact parts 13 and the united contact parts 14 of the sonotrodes 12 hence constitute two rings partially gripping the outer cylindrical surfaces 17 and 18 of the tip 6.

It is in addition preferably to form each of the sonotrodes 12 in the shape of two contact parts 13 and 14 distinct from one another, in order to be able to apply, by means of the contact part 13, at the level of the zone 8 of the cable 1, an ultrasonic power higher than that applied by the contact part 14 at the level of the zone 7 of the cable 1.

Due to the fact of this particular configuration of the sonotrodes 12, once the ultrasonic generator is placed in operation, the tip 6 and the cable 1 are connected to a radial flow of ultrasound, traversing the surfaces 17 and 18 of the tip, which causes a heating of the different elements surrounded by the sonotrodes, which heating is caused by the friction of these elements against one another.

There follows then, in the zone 7, a softening and a superficial mixing of the thermoplastic materials of the sheath 3 and of the tip 6.

On the other hand, in the zone 8, the thermoplastic material of the tip 6 softens more than in the zone 7 (since the ultrasonic power applied in the zone 8 is higher than that applied in the zone 7) and this softened material flows in the direction of those of the fibers 2 which are situated at the periphery of the bundle and mates the contour of these fibers, thereby filling the gaps or interstices 9.

In addition, at the same time as the flow of ultrasound is applied, the sonotrodes 12 are brought close to one another, without however their entering into contact with one another. Due to the fact that they are semi-cylindrical, contact surfaces 15 and 16 have a radius of curvature slightly less than that of the cable 1, the latter is gripped between the sonotrodes and undergoes a radial stress at the level of its zones 7 and 8 and this stress has the effect of compressing the cable 1, of gripping the outer sheath 3 on the fiber bundle at the level of the two zones 7 and 8, and of facilitating the flow of the softened thermoplastic material of the tip into the gaps 9 at the level of the zone 8. Moreover by giving the semi-cylindrical surface 15 of the contact part 13 of the sonotrodes a radius of curvature slightly less than that of the surface 16 of the contact part 14, whilst making these two radii of curvature be less than the radius of the cable 1, as previously indicated, it is then possible to exert on the cable 1, at the level of the zone 8, a more intense radial stress than at the level of the zone 7. There follows a progressive gripping of the fibers from the rear to the front of the tip.

Once the ultrasonic generator is stopped, the elements subjected to the flow of ultrasound are cooled. The tip 6 is welded to the sheath 3 along their respective surfaces in contact in the zone 7, this welding surface being denoted by the reference numeral 19 in the lower half view of FIG. 2. Those of the fibers 2 which are situated at the periphery of the bundle of fibers are partially surrounded by the constituent material of the tip 6 which, in the zone 8, has flowed into the interstices 9 and are thus encrusted in this material as shown in FIG. 4.

Through this fact, the reason of the radial stress exerted on the cable in the zone 7 and especially in the zone 8, the front portion of the tip 6 firmly grips the fibers 2 and prevents any movement of the latter with respect to one another, this bringing together of the fibers at the end of the cable enabling in addition, in its use, the amount of light emerging from the cable to be increased and hence the efficiency of the optical transmission thus effected to be substantially improved.

In addition, due to the fact of the double fixing of the tip 6 both on the sheath 3 and on the fibers 2, the tip cannot undergo either axial movement or rotary movement on the cable and, moreover, it prevents the sheath from being displaced along the fiber bundle, notably when the cable is folded with a rather small radius of curvature.

There will now be described, with reference to FIGS. 5 and 6, a second feature of the invention enabling the fixing of a connector tip on one end of an optical cable with a bundle of fibers coated each with an individual protector sheath.

Figure 5:
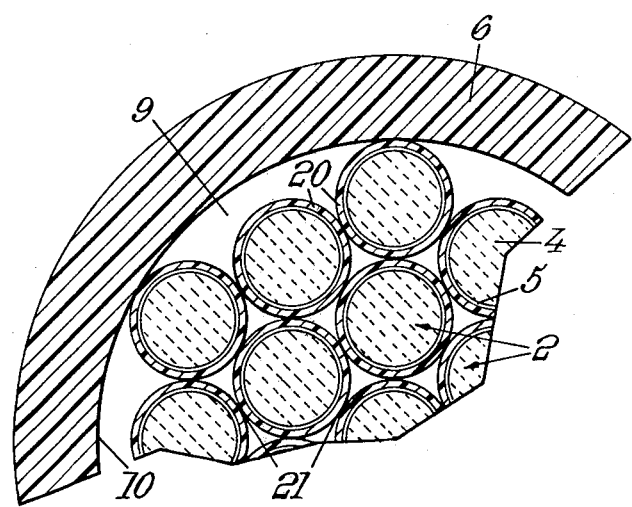
FIGS. 5 and 6 show in partial transverse section on a very large scale, along the line IV—IV of FIG. 1 an optical cable of a type different from that of FIGS. 2 to 4, respectively before and after fixing of a tip.
Figure 6:
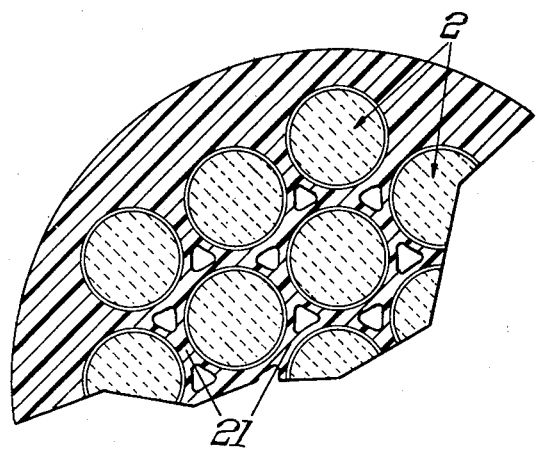

The elements of FIGS. 5 and 6 identical with those of FIGS. 1 to 4 are marked by means of the same numerical references. In fact the only difference bears on the optical fibers 2 which are each surrounded by an individual protector sheath 20 of a thermoplastic material preferably identical with the constituent material of the outer sheath 3, and hence weldable under the effect of heat with that of the tip 6.

When the end of the cable 1 of optical fibers is subjected to the flow of ultrasound, there is caused a heating and a subsequent softening of the constituent materials of the tip 6, of the outer sheath 3 and of the individual sheaths 20.

Under the effect of the radial stress exerted on the periphery of the cable 1, in the zone 8 stripped of its outer sheath, the constituent material of the tip 6 flows into the interstices 9 of the fibers 2 situated at the periphery of the bundle and is mixed superficially with the constituent material of the sheaths 20 of these peripheral fibers.

In addition, under the effect of tiny movements caused by the ultrasound, the parts in contact 21 of the sheaths 20 of the fibers 2 situated inside the bundle are heated themselves also and the sheaths fuse into one another in these parts in contact, at the same time as the fibers 2 are brought together under the action of the radial stress.

On the other hand, in the zone 7, the ultrasonic power besides being less than in the zone 8, only the materials of the tip and of the outer surface of the outer sheath soften and fuse to one another without there being however a softening of the materials of the inner surface of the outer sheath and of the individual sheaths.

Once the effect of the ultrasound ceases, there is welding of the surfaces in contact of the tip 6 and of the sheath 3, as in the first feature previously described, and there is welding, on the one hand, of the surfaces in contact of the tip 6 and of the individual sheaths 20 of those of the fibers which are situated at the periphery of the fiber bundle and, on the other hand, of the surfaces in contact of all the individual sheaths 20, inside the fiber bundle.

Finally, in the zone 8 of the cable 1 which was surrounded by the surfaces 15 of the sonotrodes 12, the constituent materials of the tip 6 and of the individual sheaths 20 are welded and, in transverse section, as shown in FIG. 6, the cable provided with its tip has the appearance of a mass of thermoplastic material coating the fibers 2 continuously, that is to say the sheaths 20 are no longer individual, but are welded to one another to form a single mass coating all the fibers. In addition, under the effect of the radial stress, the fibers 2 have been gripped together.

In addition, in the zone 7 of the cable which was surrounded by the surfaces 16 of the sonotrodes 12, the surfaces in contact of the tip and of the outer sheath are welded to one another, without however there being welding of the outer sheath and of the individual sheaths of the peripheral fibers of the bundle nor of the individual sheaths of the inner fibers of the bundle between them; moreover, under the effect of the radial stress, the fibers have been brought slightly closer to one another, and the outer sheath has been gripped around the fiber bundle.

There will now be described a third and a fourth feature of the invention, referring to FIGS. 7 and 8, in which elements identical with those of FIGS. 1 to 4 are denoted by the same reference numerals, the sonotrodes not having been shown in the interest of clarity.

The placing in position of the tip 6 on the cable 1 necessitates, according to the previously described two embodiments of the invention, the removal of the outer sheath 3 in the end zone 8 of the cable 1. This removal of a portion of the sheath, or a partial baring of the bundle of fibers, is rather delicate to carry out, for there is a risk, in the course of this operation, of damaging with the baring tool those of the fibers 2 which are at the periphery of the fiber bundle. Also, this is an operation which lengthens the time of preparation of the cable provided with its tip.

The third and fourth embodiments of the invention have the purpose of enabling the fixing of the tip 6 on a cable not bared at its end but to avoid the abovementioned baring operation.

Figure 7:
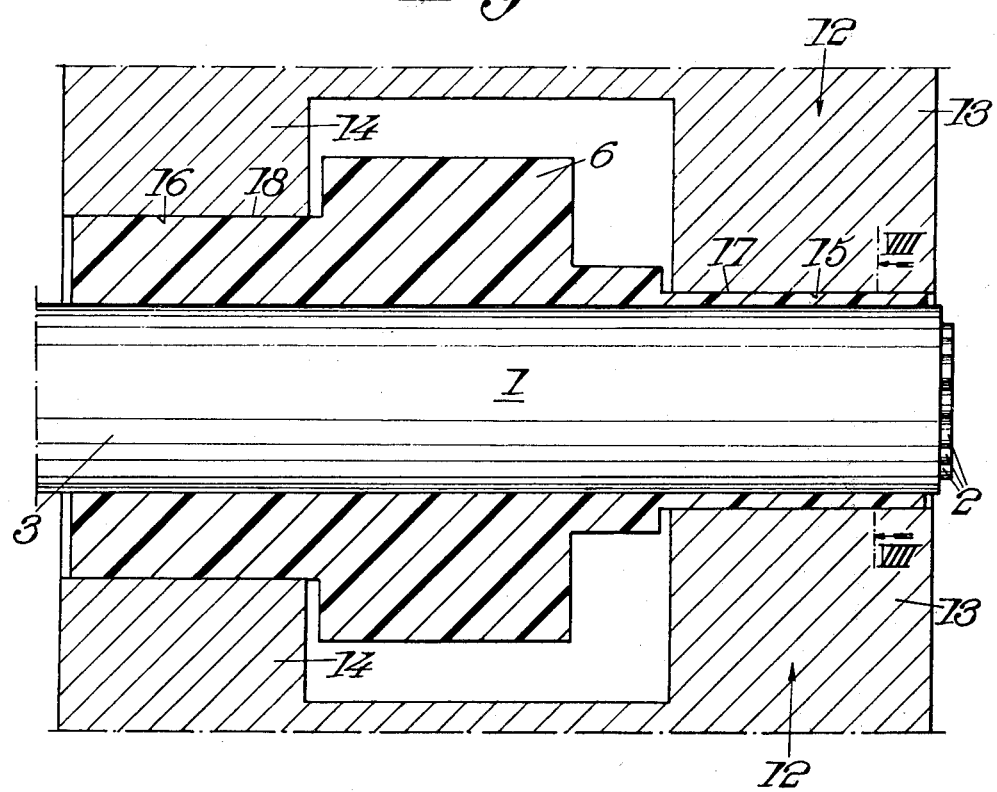
FIG. 7 illustrates, in lateral section along the axis of an optical cable of a type different from those of FIGS. 1 to 6, the placing in position of a tip on said cable.

As shown in FIG. 7, the sheath 3 surrounds the fiber bundle up to the end of the cable (in FIG. 1, the free ends of the fibers 2 extend slightly beyond the sheath: this is a drawing intended to facilitate the reading of FIG. 7, the free end of the sheath being able in practice to level off without inconvenience the free ends of the fibers 2).

Through this fact the tip 6 surrounds over its whole length a portion of the outer sheath 3.

The third feature of the invention relates very particularly to an optical cable with a bundle of bare fibers.

In transverse view, along the arrow II of FIG. 7, before the action of the ultrasound, the cable has the same appearance as in FIG. 2 relating to the first feature of the invention.

Once the cable is subject to the action of ultrasound in the same way as that described previously, the cable has at its front part in transverse section made at the level of the line VIII—VIII of FIG. 7, the appearance shown in FIG. 4: the outer insulating material, which has penetrated into the interstices 9 separating those of the fibers 2 which are situated at the periphery of the bundle, is in fact constituted by a mass of material formed by the welding over the whole of their contact surface of the tip 6 and of the sheath 3.

On the other hand, towards the rear of the tip, the tip and its outer sheath are also welded to one another over the whole of their contact surface, but the thermoplastic material of the outer sheath has not flowed into the interstices 9, due to the fact of the lower ultrasonic power applied at this level.

The fourth arrangement of the invention is, itself, relative to an optical cable with a bundle of fibers 2 each coated with an individual sheath 20.

Figure 8:
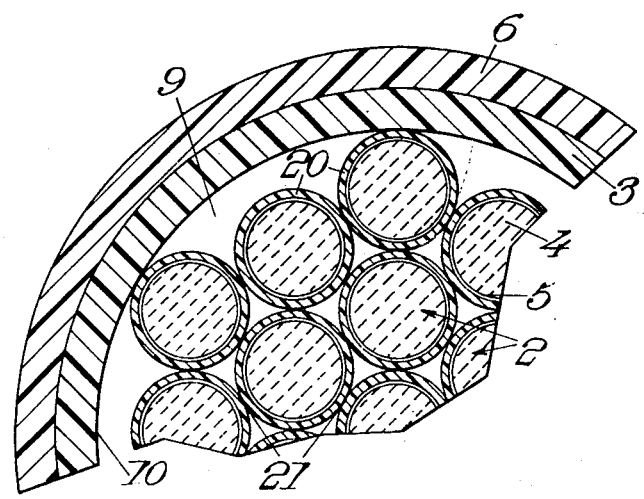
FIG. 8 shows, in partial transverse section, on a very large scale, along the line VIII—VIII of FIG. 7, an optical cable before fixing of a tip.

Before the action of the ultrasound, the cable 1 has, in transverse section drawn along the line VIII—VIII of FIG. 7, the appearance shown in FIG. 8: the fiber bundle 2 is surrounded by an outer sheath 3, itself surrounded by the tip 6.

After the action of the ultrasound, still in transverse section along the line VIII—VIII of FIG. 7, the cable 1 has the appearance shown in FIG. 6: all the individual sheaths of the fibers 2 are welded to one another, the individual sheaths of the peripheral fibers of the bundle are welded to the outer sheath, and the latter is welded to the tip, the assembly having the appearance of fibers 2 buried in a mass of more or less homogeneous plastics material.

In addition, under the action of the radial stress, due to the smaller radius of curvature of the surface 15 of the contact part 13 of the sonotrodes 12, the fibers 2 are brought closer to one another and the outer sheath 3 is gripped around the fiber bundle.

On the other hand, towards the rear of the tip, there is only welding of the tip and of the outer sheath and gripping of the outer sheath 6 around the bundle, the ultrasonic power applied at this level being insufficient to cause softening of the thermoplastics materials of the inner surface of the outer sheath and of the individual sheaths which hence cannnot be welded together.

In the embodiments of the invention which have just been described, it is assumed that the tip 6 is in the form of a tubular element threaded on the end of the optical cable.

However the introduction of the tip 6 onto this end may present some difficulties and, to remedy the latter, it may be advantageous to construct the tip in the form of two half shells which are welded to one another under the effect of the ultrasound at the same time as they are welded respectively to the outer sheath 3 and they are united with the peripheral fibers of the bundle.

The ultrasound generator may be of any suitable type, the frequency of the ultrasound being some tens of kilohertz, preferably comprised between 20 and 30 kHz, and the power being several hundreds of watts, preferably 500 to 2000 watts, according to the volume of the various elements and the depth of the effect required inside the cable 1.

There will now be described another feature of the invention which preferably is used with one or other of the preceding features, but which can also be used independently of these features.

This other feature enables, in a single and same operation, the cutting of a fiber bundle optical cable and the polishing of the front surface of the cut end.

Figure 9:
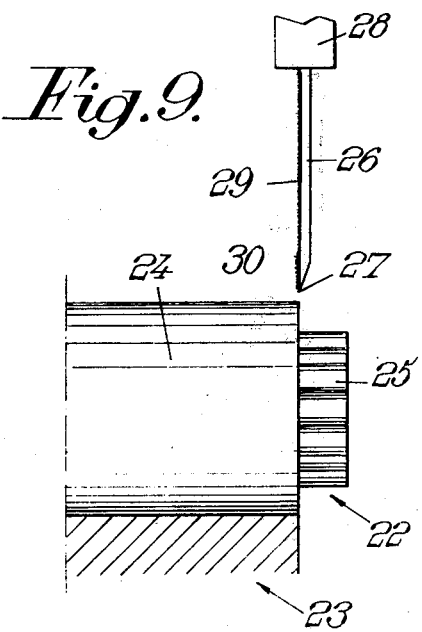
FIG. 9 is a view illustrating a method of cutting and polishing an optical cable according to the invention.

In FIG. 9, it is assumed that the end of the cable 22 had been provided with a connector tip 24, for example fixed according to one or other of the abovementioned processes.

The end of the cable 22 is applied on a support 23 below a knife 26.

This knife 26 includes a blade or cutting edge 27, preferably furnished with diamonds and provided, at least on its surface turned toward the front surface of the cable, with an abrasive coating 30 of rather coarse granulometry (on the order of a micron to several microns). The surface 29 of the knife following the blade 27 and intended to coact with the front surface of the bundle is coated with an abrasive with a very fine granulometry (on the order of 0.25 to 0.5μ) intended to surface the end of the cable 22 with the required polish.

This knife is supported by a tool carrier connected to an ultrasonic generator (not shown) capable of generating vertical ultrasonic vibrations having a frequency on the order of 20 kHz.

The knife is applied to the part of the bundle to be cut with a vertical force F: in general, the weight itself of the knife and of the apparatus is sufficient to cut the bundle, but it is possible also to resort to a suitable pressing device, for example hydraulic or pneumatic.

Progressively as the cutting edge 27 cuts the bundle, under the effect of vibrations caused by the ultrasound, the coating 30 effects a first coarse polishing of the surface of the bundle which has just been cut, then the abrasive coating of the surface 29 terminates the polishing to give the desired surface state.

The advantage of this process is that it unites in a single operation, on the one hand, the cutting of the bundle and, on the other hand, the polishing of the front surface of the latter, whilst techniques used up to the present necessitated two distinct operations.

Another advantage of this process is that it can be put into practice in the same machine as that which has served for fixing a tip on the end of the bundle: it is hence unnecessary to reposition the end of the bundle, and the trued surface of the bundle is perfectly perpendicular to the axis of the tip, which enables the obtaining of optical connections of good quality thereby reducing light losses to the minimum.

In a modification of the process which has just been described, a simple steel knife is used, with a non-diamonded blade, a liquid abrasive being projected above the cutting line, between the surfaces in contact of the blade and of the bundle.

As is self-evident, and as emerges already from the foregoing, the invention is in no way limited to those of its types of application and embodiments which have been more especially envisaged; it encompasses, on the contrary, all modifications.

I claim:

1. Process for fixing a connector tip to one end of an optical cable of a bundle of fibers surrounded by an outer protector sheath constituted by a thermoplastic material, the tip being also constituted by a thermoplastic material weldable under the effect of heat with that of the outer sheath, said process comprising the sequence of the following steps: removing the sheath of the cable in the vicinity of said end, placing the tip in position on said end so that it surrounds and is in contact with, on the one hand, a zone of the cable stripped of its outer sheath and, on the other hand, a zone of the cable provided with its outer sheath and adjacent to said strippd zone, and subjecting the tip to a radial flow of ultrasound at the same time as exerting a radial compressive force on it, by means of which, on the one hand, in the region of the tip surrounding the outer sheath, the surfaces in contact with the tip and with the outer sheath are welded to one another and the outer sheath is grippd around said bundle and on the other hand, in the region of the tip surrounding the zone of the cable stripped of its outer sheath, the softened thermoplastic material of the tip is caused to penetrate between those fibers which are situated at the periphery of the bundle and in the immediate vicinity of the tip and the fibers of the bundle are gripped together.

2. Process for fixing a connector tip to one end of an optical cable of a bundle of fibres surrounded by an outer protector sheath, each fibre being itself surrounded by an individual protector sheath, the outer sheath and the individual sheaths being constituted by thermoplastic materials, the tip being also constituted by a thermoplastic material weldable under the action of heat with those of the outer sheath and of the individual sheaths, said process comprising the succession of the following steps:

removing the outer sheath of the cable in the vicinity of the abovesaid end of the latter, whilst leaving the individual sheaths around the corresponding fibres, placing the tip in position on this end so that it surrounds and is in contact with, on the one hand, a zone of the cable stripped of its outer sheath and, on the other hand, a zone of the cable provided with its outer sheath and adjacent to said zone stripped of its outer sheath, and the end is subjected to a radial flow of ultrasound at the same time as exerting a radial compressive force on it due to which, on the one hand, in the region of the tip surrounding the outer sheath, the surfaces in contact with the tip and with the outer sheath are welded to one another and the outer sheath is gripped around the bundle of fibres and, on the other hand, in the region of the tip surrounding the zone of the cable stripped of its outer sheath, the tip and the individual sheaths of those of the fibres which are situated at the periphery of the bundle of fibres and in the immediate proximity of the tip, are welded along their lines of contact, at least the individual sheaths of those of the fibres which are situated at the periphery of the bundle of fibres are welded together along their lines of contact, and the fibres of the bundle are gripped together.

3. Process for fixing a connector tip to one end of an optical cable of a bundle of fibres surrounded by an outer protector sheath constituted by a thermoplastic material, the tip being also constituted by a thermoplastic material weldable under the effect of heat with that of the outer sheath, this process comprising the succession of the following steps:

placing the tip in position on the end of the optical cable so that it surrounds and is in contact over the whole of its length with a zone of the cable provided with its outer sheath, and subjecting the tip to a radial flow of ultrasound at the same time as exerting on it a radial compressive force, due to which, on the one hand, the surfaces in contact of the tip and of the outer sheath are welded to one another and the outer sheath is gripped around the bundle of fibres and, on the other hand, in the front part of the tip, the softened thermoplastic material of the outer sheath is made to penetrate between those of the fibres which are situated at the periphery of the bundle of fibres and in the immediate vicinity of the outer sheath and the fibres are gripped together.

4. Process for fixing a connector tip to one end of an optical cable of a bundle of fibres surrounded by an outer protector sheath, each fibre being itself surrounded by an individual protector sheath, the outer sheath and the individual sheaths being constituted by a thermoplastic materials weldable together under the effect of heat, the tip being also constituted by a thermoplastic material weldable under the effect of heat with that of the outer sheath and the materials of the outer and individual sheaths being also weldable together under the effect of heat, this process comprising the succession of the following steps:

placing the tip in position on the end of the cable so that it surrounds and is in contact over the whole of its length with a zone of the cable provided with its outer sheath, and subjecting the tip to a radial flow of ultrasound at the same time exerting on it a radial compressive force, due to which, on the one hand, the surfaces in contact of the tip and of the outer sheath are welded to one another and the outer sheath is gripped around the bundle of fibers and, on the other hand, in the front part of the tip, the outer sheath and the individual sheaths of those of the fibers which are situated at the periphery of the bundle of fibers and in immediate proximity to the outer sheath, are welded along their lines of contact, and the fibers are gripped together.

5. Process according to claim 1, wherein the tip is made in the form of two half-shells coupled to one another to surround the end of the optical cable, and these two half shells are welded to one another under the effect of ultrasound.

6. Process according to claim 1, wherein the front part and the rear part of the tip are subjected to radial compressive forces of different intensities, the force exerted on the front part of the tip being greater than the force exerted on the rear part of the tip.

7. Process for cutting a fibre bundle optical cable and polishing the front surface of said cable, notably of a cable provided with a tip positioned according to the process of claim 1, the cutting of the cable and the polishing of its front surface being effected in the course of a single and same operation, by means of a knife subject to the effect of ultrasound, an abrasive being interposed between the front surface of the optical cable and the facing surface of the knife.

8. Process according to claim 7, wherein the surface of the knife facing the front surface of the optical cable is covered with an abrasive of relatively fine granulometry and the cutting edge of the knife is coated with an abrasive of relatively coarse granulometry.

9. Process according to claim 7, wherein the surface of the knife facing the front surface of the optical cable is smooth and a liquid containing an abrasive of relatively fine granulometry is projected between the face of the knife and the front surface of the cable.

10. Process according to claim 7, wherein the cutting edge of the knife is diamonded.

11. Process according to claim 7, wherein the knife is applied to the cable under the action of pressure means.

12. Fibre bundle optical cable surrounded by an outer protector sheath constituted by a thermoplastic material and provided at one of its ends with a connector tip, the cable being stripped of its outer sheet in the vicinity of said end and the tip surrounding, on the one hand, a zone of the cable stripped of its outer sheath and, on the other hand, a zone of the cable provided with its outer sheath and adjacent to said zone stripped of its outer sheath, the tip being also constituted by a thermoplastic material weldable under the effect of heat with that of the outer sheath and wherein, on the one hand, in the region of the tip surrounding the outer sheath, the surfaces in contact of the tip and of the outer sheath are welded to one another, the outer sheath being gripped around the bundle of fibres and, on the other hand, in the region of the tip surrounding the zone of the cable stripped of its outer sheath, the constituent material of said tip occupies at least partially the interstices comprised between those of the fibres which are situated at the periphery of the bundle of fibres and which are in contact with the tip, the fibres being gripped together.

13. Fibre bundle cable surrounded by an outer protector sheath and provided at one of its ends with a connector tip, each fibre being itself surrounded by an individual protector sheath, the outer sheath and the individual sheaths being of thermoplastics materials, the cable being stripped of its outer sheath in the vicinity of said end and the tip surrounding, on the one hand, the zone of the cable stripped of its outer sheath and, on the other hand, a zone of the cable provided with its outer sheath and adjacent to said zone stripped of its outer sheath, said tip being also of a thermoplastic material weldable under the effect of heat with those of the outer sheath and of the individual sheaths and, on the one hand, the tip and the outer sheath being welded to one another over the whole of their contact surface, the outer sheath being gripped around the bundle of fibres and, on the other hand, in the zone of the tip surrounding the zone of the cable stripped of its outer sheath, the tip and the individual sheaths of those of the fibres which are situated at the periphery of the bundle of fibres are welded along their lines of contact and at least the individual sheaths of said fibres situated at the periphery of the bundle of fibres are welded together along their lines of contact, the fibres being gripped together.

14. Fibre bundle optical cable surrounded by an outer protector sheath consituted by a thermoplastic material and provided at one of its ends with a connector tip surrounding over its whole length a zone of the cable provided with its outer sheath, the tip being also constituted by a thermoplastic material weldable under the effect of heat with that of the outer sheath and, on the one hand, the tip and the outer sheath being welded to one another over all their surface in contact, the outer sheath being gripped around the bundle of fibres and, on the other hand, in the front part of the tip, the material constituting the outer sheath occupying at least partially the interstices comprised between those of the fibres which are situated at the periphery of the bundle of fibres and which are in contact with the outer sheath, the fibres being gripped together.

15. Fibre bundle optical cable surrounded by an outer protector sheath provided at one of its ends with a connector tip, over the whole of its length a zone of the cable provided with its outer sheath, each fiber being itself surrounded by an individual protector sheath, the outer sheath and the individual sheaths being of thermoplastic materials weldable together under the effect of heat, the tip being also of a thermoplastic material weldable under the effect of heat with that of the outer sheath and, on the one hand, the tip and the outer sheath being welded to one another over the whole of their contact surface, the outer sheath being gripped around the bundle of fibers, and on the other hand, in the front part of the tip, the outer sheath and individual sheaths of those of the fibers which are situated at the periphery of the bundle of fibers being welded together along their lines of contact, the fibers being gripped together.

16. Fiber bundle optical cable according to claim 12, wherein the tip exerts a radial stress on the optical cable, so as to prevent any relative movement between the fibers.

17. Fiber bundle optical cable according to claim 12, wherein the tip is constituted of two half shells welded to one another.

18. Fiber bundle optical cable according to claim 13, wherein all the individual sheaths of the bundle of fibers are welded together along their lines of contact.

* * * * *